Patented Feb. 3, 1942

2,271,942

UNITED STATES PATENT OFFICE 2,271,942

PROCESS FOR THE POLYMERIZATION OF GASEOUS OLEFINS

Emil Keunecke, Ludwigshafen-on-the-Rhine, and Herbert Grasshof, Mannheim, Germany, assignors, by mesne assignments, to William E. Currie, New York, N. Y.

No Drawing. Application April 29, 1938, Serial No. 205,004. In Germany May 14, 1937

4 Claims. (Cl. 196—10)

The present invention relates to an improved process for the polymerization of gaseous olefins to liquid hydrocarbons, in particular those of the boiling range of benzine.

For the polymerization of gaseous olefins, such as ethylene, propylene, butylene or isobutylene or mixtures containing the same, to form liquid hydrocarbons in particular those of the boiling range of benzine, it has already been proposed to use as catalysts acids of phosphorus, as for example orthophosphoric acid. These acids may be used without the addition of other substances; better results are obtained, however, when they are mixed with or applied to substances having a large surface, such as kieselguhr, montmorillonite, active carbon and the like. Salts of phosphoric acid, in particular the acid salts, have also been proposed as catalysts for the said polymerization; their activity is, however, less than that of the free acids.

We have now found that catalysts containing salts of acids of phosphorus together with the free acids of phosphorus (orthophosphoric acid, pyrophosphoric acid, phosphorus pentoxide, metaphosphoric acid or mixtures of these acids) in amounts approximately corresponding to 1 molecular proportion of primary orthophosphate to from 0.5 to 1 molecular proportion of orthophosphoric acid have a high activity and a long working life. As salts there may be mentioned in particular the phosphates of the light metals of the 2nd group of the periodic system, as for example the phosphates of magnesium, strontium, barium and in particular of calcium; in the latter case it is advantageous to use a composition in which the ratio by weight of $P_2O_5$ to CaO lies between about 3 and 4. This mixture of phosphate and acid yields dry and solid catalysts of high activity even after heating for a short time.

For the preparation of the catalysts it is advantageous to start from primary or secondary phosphates; these are mixed with an addition of a from 80 to 100 per cent phosphoric acid while stirring intimately, the viscous mass formed being heated at elevated temperature between about 200° and 300° C., preferably between 240° and 260° C., whereby it becomes solid and dry. The resulting salts containing excess acid are cooled and comminuted and sieved to the desired grain size. The sieved-off portion may be added to a fresh mixture of phosphate and acid which has not yet been heated or pressed as such into shaped pieces. With an average grain size of from about 3 to 5 millimeters, the calcium phosphate catalysts prepared in the said manner have a filling-weight of between 700 and 900 grams per liter of filling-volume. Instead of starting from primary or secondary phosphates, tertiary phosphates or metal oxides may be used and mixed with appropriately larger amounts of phosphoric acid and heated.

The conversion of the gaseous olefins to liquid hydrocarbons is carried out with the said catalysts at temperatures between 100° and 300°, advantageously between 200° and 250° C., the said temperatures being hereinafter referred to for the sake of brevity as polymerizing temperatures. As suitable initial olefins in particular propylene and butylenes (including isobutylene) or mixtures containing the same come into consideration. Suitable mixtures containing these olefins are especially cracking gases; but also other industrial gases containing gaseous olefins may also be used.

Phosphates of other metals than the light metals of group 2 of the periodic system, as for example copper phosphate, zinc pyrophosphate and the like, may also be added to the mixtures consisting of the above mentioned phosphates and free acid; the amount of additional phosphates of the metals other than the light metals of group 2 of the periodic system need not be the same as that of the phosphates of the light metals of group 2; it is even preferable to add the said further phosphates, as for example the copper phosphate which effects a remarkable increase in the yields of the desired liquid hydrocarbons in only small amounts, such as from 1 to 10 per cent by weight of the phosphoric acid. The supply of these small amounts of further phosphates may also be effected by adding other salts, such as the chlorides, carbonates or acetates which are converted into the corresponding phosphates by the action of the free phosphoric acid. The addition of zinc phosphates or other zinc salts together with the addition of phosphates of light metals of the group prolongs the working life of the catalysts.

Also other substances than salts, in particular those which are capable of imparting to the catalyst a higher mechanical stability, such as kieselguhr, active charcoals, starch, linseed oil or the active bleaching earth known under the trade name "Tonsil," may be added in small amounts.

It is not necessary to prepare the catalysts by mixing the phosphates with the free acid and then heating the mixture to about from 200° to 300° C. Catalysts of similar composition and activity can be obtained without the said heating stage for example by combining the phosphate with an appropriate amount of phosphoric acid in aqueous solution and isolating from the solution a mixture containing the phosphate and phosphoric acid in the desired ratio, in particular by evaporating water or also by other measures, as for example cooling of concentrated solutions.

For example if 1 molecular proportion of secondary calcium phosphate be dissolved in about 2 to 4 molecular proportions of dilute phosphoric acid and the solution be evaporated, a crystalline product is precipitated which after drying may readily be pressed into shaped pieces and constitutes an active catalyst. The resulting crystalline precipitate which contains the salt and the free acid in the desired proportion does not merely consist of a mixture of the salt and the free acid but also contains compounds of the phosphate with the phosphoric acid which may have various stoichiometrical compositions, as for example the compound $Ca(H_2PO_4)_2.H_3PO_4$.

This method of preparation of the catalysts with which no calcination is necessary and a simple drying at temperatures which at the most only reach the lower limit of the calcination temperature is sufficient, constitutes a considerable simplification.

The following examples will further illustrate the nature of this invention but the invention is not restricted to these examples.

Example 1

170 grams of secondary calcium phosphate $(CaHPO_4.2H_2O)$ are heated at 250° C. for 9 hours with 195 grams of 89 per cent phosphoric acid. In the resulting mixture, the ratio of $P_2O_5$ to CaO is equal to 3.48, corresponding to a ratio of primary orthophosphate to free phosphoric acid equal to 1 to 0.75. The catalyst after having been comminuted and sieved to an average grain size of from 3 to 5 millimeters has a filling-weight amounting to 806 grams per liter of filling-volume.

If moist propylene be led at 200° C., at atmospheric pressure and at a speed of flow of 3 liters per hour over 100 cubic centimeters of the said catalyst, there are obtained at the third day 132.5 cubic centimeters of a polymerization product of which about 85 per cent boils up to 200° C. (corresponding to 987 grams per day per liter of catalyst); at the 7th day there are obtained 138 cubic centimeters of polymerization product (corresponding to 1028 grams per day per liter of catalyst).

Example 2

A catalyst is prepared from secondary calcium phosphate and phosphoric acid as described in Example 1. The catalyst is comminuted and sieved to an average grain size of from 3 to 5 millimeters and the filling-weight then amounts to 792 grams per liter of filling-volume.

If moist isobutylene be led over 100 cubic centimeters of the said catalyst at 200° C., atmospheric pressure and a speed of flow of 6 liters per hour, there are obtained at the 2nd day 419 cubic centimeters of polymerization product of which about 95 per cent boil up to 200° C. (corresponding to 2933 grams per day per liter of catalyst).

Example 3

252 grams of primary calcium phosphate $(Ca(H_2PO_4)_2.H_2O)$ are heated at 250° C. for 5 hours with 55 grams of 89 per cent phosphoric acid. The ratio of $P_2O_5$ to CaO in the resulting mixture is equal to 3.17, corresponding to a ratio of primary orthophosphate to free phosphoric acid equal to 1 to 0.5. The catalyst is comminuted and sieved to an average grain size of from 3 to 5 millimeters and its filling-weight then amounts to 787 grams per liter of filling-volume.

If moist propylene be led over 100 cubic centimeters of the said catalyst at 200° C., at atmospheric pressure and at a speed of flow of 3 liters per hour, there are obtained at the 3rd day 80.5 cubic centimeters of a polymerization product of which about 85 per cent boil up to 200° C. (corresponding to 596 grams per day per liter of catalyst).

Example 4

175 grams of secondary magnesium phosphate $(MgHPO_4.3H_2O)$ are heated at 300° C. for 4 hours with 165 grams of 89 per cent phosphoric acid. The resulting dry mixture, in which the ratio of $P_2O_5$ to MgO is equal to 4.41, corresponding to a ratio of primary orthophosphate to free phosphoric acid equal to 1 to 0.5, is pressed into pieces having a grain size of 5 millimeters. The filling-weight then amounts to 985 grams per liter of filling-volume.

If moist propylene be led over 100 cubic centimeters of the said catalyst at 200° C., at atmospheric pressure and at a speed of flow of 3 liters per hour, there are obtained at the 3rd day 62 cubic centimeters of a polymerization product of which about 85 per cent boil up to 200° C. (corresponding to 459 grams per day per liter of catalyst).

Example 5

If a moist industrial gas containing 32 per cent of olefins (mainly propylene) be led at a speed of flow of 6 liters per hour under an excess pressure of 50 atmospheres at 200° C. over 10 cubic centimeters of the catalyst prepared according to Example 1, there are obtained per day per liter of catalyst an average of 11 kilograms of a polymerization product of which about 85 per cent boil up to 200° C.

Example 6

56 grams of calcium oxide are heated at 250° C. for 9 hours with 300 grams of 89 per cent phosphoric acid. The ratio of $P_2O_5$ to CaO in the resulting mixture is equal to 3.48, corresponding to a ratio of primary orthophosphate to free phosphoric acid equal to 1 to 0.75. After comminution and sieving to an average grain size of from 3 to 5 millimeters, the catalyst has a filling-weight of 795 grams per liter of filling-volume.

If moist propylene be led over 100 cubic centimeters of the said catalyst at 200° C., at atmospheric pressure and at a speed of flow of 3 liters per hour, there are obtained at the 3rd day 121 cubic centimeters of a polymerization product of which about 85 per cent boil up to 200° C. (corresponding to 908 grams per day per liter of catalyst).

Example 7

170 grams of secondary calcium phosphate and 400 grams of 89 per cent phosphoric acid are dissolved in 1 liter of water, the major portion of the water being then evaporated at atmospheric pressure. The product precipitated from the strongly concentrated solution is filtered off by suction, pressed out well, dried for 2 hours at 200° C. and pressed into shaped pieces. With a grain size of an average of from 3 to 5 millimeters, the filling-weight is 1010 grams per liter of filling-volume. The composition of the catalyst thus obtained corresponds to the ratio of 1 molecular proportion of primary orthophosphate to 0.5 molecular proportion of orthophosphoric acid. If moist propylene be led over 100 cubic centimeters of said catalyst at 200° C. under atmospheric pressure and at a speed of flow of 3 liters per hour, there are obtained at the 3rd day 111 cubic centimeters of a polymerization product of which about 85 per cent boil up to 200° C. (corresponding to 821 grams of polymerization product per day per liter of catalyst).

What we claim is:

1. A process for the polymerization of gaseous olefins to liquid hydrocarbons which comprises contacting such olefins at a polymerizing temperature with a solid catalyst essentially comprising a composition of a salt of a light metal of the second group of the periodic system and an acid of phosphorus, together with a free acid of phosphorus, in a ratio approximately corresponding to 1 molecular proportion of the primary orthophosphate of said light metal to from 0.5 to 1 molecular proportion of orthophosphoric acid.

2. A process as claimed in claim 1 in which said light metal is calcium.

3. A process for the polymerization of gaseous olefins to liquid hydrocarbons which comprises contacting such olefin at a polymerizing temperature with a solid catalyst essentially comprising a mixture of a salt of a light metal of the second group of the periodic system and an acid of phosphorus, together with a free acid of phosphorus, said catalyst having been prepared by heating a substance selected from the group consisting of primary, secondary and tertiary phosphates of a light metal of the second group of the periodic system with phosphoric acid, using such proportions of said metal compound relative to phosphoric acid that the reaction product contains a ratio of approximately 1 molecular proportion of primary orthophosphate to from 0.5 to 1 molecular proportions of orthophosphoric acid.

4. A process for the polymerization of gaseous olefins to liquid hydrocarbons which comprises contacting such olefin at a polymerizing temperature with a solid catalyst essentially comprising a mixture of a salt of a light metal of the second group of the periodic system and an acid of phosphorus, together with a free acid of phosphorus, said catalyst having been prepared by heating a metal oxide of a light metal of the second group of the periodic system with phosphoric acid, using such proportions of said metal compound relative to phosphoric acid that the reaction product contains a ratio of approximately 1 molecular proportion of primary orthophosphate to from 0.5 to 1 molecular proportions of orthophosphoric acid.

EMIL KEUNECKE.
HERBERT GRASSHOF.